(12) United States Patent
Kanamori et al.

(10) Patent No.: US 11,210,686 B2
(45) Date of Patent: Dec. 28, 2021

(54) MANAGEMENT DEVICE, MANAGEMENT METHOD, AND STORAGE MEDIUM

(71) Applicant: HONDA MOTOR CO., LTD., Tokyo (JP)

(72) Inventors: Iori Kanamori, Wako (JP); Kentaro Nagoshi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 60 days.

(21) Appl. No.: 16/774,026

(22) Filed: Jan. 28, 2020

(65) Prior Publication Data

US 2020/0250693 A1  Aug. 6, 2020

(30) Foreign Application Priority Data

Feb. 1, 2019 (JP) .............................. JP2019-016853

(51) Int. Cl.
| | |
|---|---|
| *G06Q 30/02* | (2012.01) |
| *G06Q 40/06* | (2012.01) |
| *G06Q 50/06* | (2012.01) |
| *B60L 58/10* | (2019.01) |
| *B60L 53/66* | (2019.01) |
| *B60L 50/60* | (2019.01) |
| *G06Q 10/00* | (2012.01) |

(52) U.S. Cl.
CPC .......... *G06Q 30/0206* (2013.01); *B60L 50/60* (2019.02); *B60L 53/665* (2019.02); *B60L 58/10* (2019.02); *G06Q 40/06* (2013.01); *G06Q 50/06* (2013.01); *G06Q 10/30* (2013.01)

(58) Field of Classification Search
CPC ............ G06Q 10/00–50/00; B06L 1/00–58/00

USPC ................................................ 705/7.11–7.42
See application file for complete search history.

(56) References Cited

U.S. PATENT DOCUMENTS

| | | | | |
|---|---|---|---|---|
| 7,373,320 B1* | 5/2008 | McDonough | .......... | G06Q 40/00 705/35 |
| 8,442,846 B2* | 5/2013 | Nesgos | .................. | G06Q 40/06 705/4 |
| 8,712,908 B2* | 4/2014 | Yang | ...................... | G06Q 40/00 705/39 |
| 8,799,064 B2* | 8/2014 | Ivers | .................. | G06Q 30/0226 705/14.11 |
| 10,311,517 B1* | 6/2019 | Berliner | ................. | G06Q 40/04 |
| 2002/0046144 A1* | 4/2002 | Graff | ..................... | G06Q 40/00 705/36 R |

(Continued)

FOREIGN PATENT DOCUMENTS

JP         2010-244492        10/2010

OTHER PUBLICATIONS

Dunn, Max, et al. "Electric vehicle lease securitization." Presidico Graduate School (2011). (Year: 2011).*

(Continued)

*Primary Examiner* — Alan S Miller
(74) *Attorney, Agent, or Firm* — Amin, Turocy & Watson, LLP (57) ABSTRACT

A management device includes a manager that is configured to manage information related to a price of securities, which is obtained by securitizing a part of a monetary value of a secondary battery provided to a user, a price assessor that is configured to access the price of the securities, and a provider that is configured to provide the price of the securities assessed by the price assessor.

7 Claims, 5 Drawing Sheets

(56) References Cited

U.S. PATENT DOCUMENTS

| | | | | |
|---|---|---|---|---|
| 2003/0126048 A1* | 7/2003 | Hollar | G06Q 40/02 | 705/30 |
| 2003/0163405 A1* | 8/2003 | Wiener | G06Q 40/04 | 705/36 R |
| 2004/0030624 A1* | 2/2004 | Nishimaki | G06Q 40/00 | 705/35 |
| 2004/0054613 A1* | 3/2004 | Dokken | G06Q 40/04 | 705/36 R |
| 2004/0177022 A1* | 9/2004 | Williams | G06Q 40/08 | 705/36 R |
| 2005/0197857 A1* | 9/2005 | Avery | G06Q 40/025 | 705/26.1 |
| 2006/0212380 A1* | 9/2006 | Williams | G06Q 40/06 | 705/35 |
| 2007/0112577 A1* | 5/2007 | Bohlig | G06Q 10/30 | 405/129.85 |
| 2008/0091626 A1* | 4/2008 | Kremen | G06Q 50/06 | 705/412 |
| 2008/0270276 A1* | 10/2008 | Herzig | G06Q 50/06 | 705/35 |
| 2009/0164360 A1* | 6/2009 | Yoon | G06Q 40/06 | 705/37 |
| 2010/0106634 A1* | 4/2010 | Atureliya | G06Q 10/103 | 705/35 |
| 2010/0241489 A1* | 9/2010 | Ivers | G06Q 30/0226 | 705/14.27 |
| 2011/0191234 A1* | 8/2011 | Kiron | G06Q 40/04 | 705/37 |
| 2013/0024252 A1* | 1/2013 | Sicklick | B29B 17/0026 | 705/14.4 |
| 2013/0030846 A1* | 1/2013 | Nesgos | G06Q 40/08 | 705/4 |
| 2013/0204767 A1* | 8/2013 | Avery | G06Q 40/025 | 705/37 |
| 2013/0226763 A1* | 8/2013 | Kremen | G01D 4/004 | 705/37 |
| 2014/0019171 A1* | 1/2014 | Koziol | G06Q 40/08 | 705/4 |
| 2015/0278945 A1* | 10/2015 | Michella | G06Q 40/06 | 705/38 |
| 2017/0176505 A1* | 6/2017 | Ramachandran | H02J 13/0086 | |
| 2019/0333166 A1* | 10/2019 | Simpson | G06Q 50/06 | |
| 2020/0011683 A1* | 1/2020 | Simpson | G06F 16/29 | |

OTHER PUBLICATIONS

Mengnuo, Duan. "Research on the Securitization of Electric Vehicle Charging Network." 2018 China International Conference on Electricity Distribution (CICED). IEEE, 2018. (Year: 2018).*

Zhou, Yan, Todd Levin, and Steven E. Plotkin. "Plug-in electric vehicle policy effectiveness: Literature review." (2016). (Year: 2016).*

* cited by examiner

| INVESTOR ID | SECURITY HOLDING PROPORTION (%) |
|---|---|
| 0001 | SECURITY NO. 1: 20<br>SECURITY NO. 5:100<br>SECURITY NO. 20: 60<br>⋮ |
| 0002 | SECURITY NO. 4: 10<br>SECURITY NO. 6: 40<br>⋮ |
| 0003 | SECURITY NO. 2: 50<br>SECURITY NO. 19: 82<br>SECURITY NO. 48: 14<br>⋮ |
| | |

| SECURITY NUMBER | BATTERY ID | SECURITY PURCHASE PRICE | RESOURCE 1 (CONTENT) | RESOURCE 2 (CONTENT) | RESOURCE 3 (CONTENT) | SOH | SECURITY PRICE | CG | BUSINESS REVENUE | IG |
|---|---|---|---|---|---|---|---|---|---|---|
| 1 | ○○ | ○○ JPY | ○○ g | ○○ g | ○○ g | Lv2 | ○○ JPY | ○○ JPY | ○○ JPY | ○○ JPY |
| 2 | ○○ | ○○ JPY | ○○ g | ○○ g | ○○ g | Lv4 | ○○ JPY | ○○ JPY | ○○ JPY | ○○ JPY |
| 3 | ○○ | ○○ JPY | ○○ g | ○○ g | ○○ g | Lv1 | ○○ JPY | ○○ JPY | ○○ JPY | ○○ JPY |
| ... | | | | | | | | | | |

MANAGEMENT DEVICE, MANAGEMENT METHOD, AND STORAGE MEDIUM

CROSS-REFERENCE TO RELATED APPLICATION

This application claims priority to and the benefit from Japanese Patent Application No. 2019-016853, filed on Feb. 1, 2019, the contents of which are hereby incorporated by reference into the present application.

BACKGROUND OF THE INVENTION

Field of the Invention

The present invention relates to a management device, a management method, and a storage medium.

Description of Related Art

In recent years, more electric vehicles and hybrid vehicles, which have secondary batteries for traveling mounted therein, have been distributed. Since in-vehicle secondary batteries mounted in electric vehicles and the like are generally expensive, the electric vehicles and the like also tend to be expensive due to reflection of prices of the secondary batteries. In order to lower the sales price of the electric vehicles as much as possible to promote sales of the electric vehicles, there is a technology of employing a price configuration including two rights, namely an ownership and a right of use in the related art (for example, Japanese Unexamined Patent Application, First Publication No. 2010-244492, hereinafter, referred to as "Patent Document 1"). According to the technology, a price paid by a person for which a right of use is set (a purchaser of a vehicle) is reduced, and prices of electric vehicles and secondary batteries are lowered by a person with an ownership setting the right of use and providing use limitations to the right of use.

The technology disclosed in Patent Document 1 is adapted to adjust the price by adjusting a right relationship between the person with the ownership and the person for which the right of use is set. Therefore, since no third person or the like adjusts the price, there are limitations in price reduction for the secondary battery and the electric vehicle.

The invention was made in view of such circumstances, and one of objectives thereof is to provide a management device, a management method, and a storage medium capable of reducing a price of a secondary battery to a low price.

SUMMARY OF THE INVENTION

A management device, a management method, and a storage medium according to the invention employ the following configurations.

(1): A management device according to first aspect of the invention includes: a manager that is configured to manage information related to a price of securities, which is obtained by securitizing a part of a monetary value of a secondary battery provided to a user; a price assessor that is configured to assess the price of the securities; and a provider that is configured to provide the price of the securities assessed by the price assessor.

(2): In the aspect (1), the manager is configured to manage information related to an investor who has purchased the securities, and the provider is configured to provide the price of the securities to at least the investor.

(3): In the aspect (1) or (2), the securitized part of the monetary value of the secondary battery includes a price of recyclable resources in the secondary battery, and the price assessor is configured to assess the price of the securities on the basis of the price of the resources.

(4): In any of the aspects (1) to (3), the management device further includes: a dividend assessor that is configured to assess a dividend of the securities on the basis of revenue of an electric power exchanging business performed through connection between the secondary battery and an electric power network.

(5): In any of the aspects (1) to (4), the secondary battery is mounted in a vehicle and is configured to supply electric power to cause the vehicle to travel.

(6): According to a second aspect of the invention, there is provided a management method comprising, by a computer: managing information related to a price of securities, which is obtained by securitizing a part of a monetary value of a secondary battery provided to a user, and an investor who has purchased the securities; assessing the price of the securities; and providing the assessed price of the securities at least to the investor.

(7): According to a third aspect of the invention, there is provided a non-transitory computer-readable storage medium that is configured to store a program that causes a computer to: manage information related to a price of securities, which is obtained by securitizing a part of a monetary value of a secondary battery provided to a user, and an investor who has purchased the securities; assess the price of the securities; and provide the assessed price of the securities at least to the investor.

According to (1) to (7), it is possible to reduce the price of the secondary battery to a low price.

According to (2) and (3), it is possible to assess the price of the securities in accordance with the value of the secondary battery.

According to (4), it is possible to enhance the value of the securities.

According to (5), it is possible to reduce the price of the vehicle with the secondary battery mounted therein to a low price.

DETAILED DESCRIPTION OF THE INVENTION

Hereinafter, an embodiment of a management device, a management method, and a storage medium according to the invention will be described with reference to drawings. Although a vehicle 10 is assumed to be an electric vehicle with a secondary battery mounted therein in the following description, the vehicle 10 may be any vehicle as long as the vehicle is externally rechargeable and includes a secondary battery mounted therein to supply electric power for traveling, and the vehicle 10 may be a hybrid vehicle or a fuel cell vehicle.

[Overall Configuration]

Figure 1:
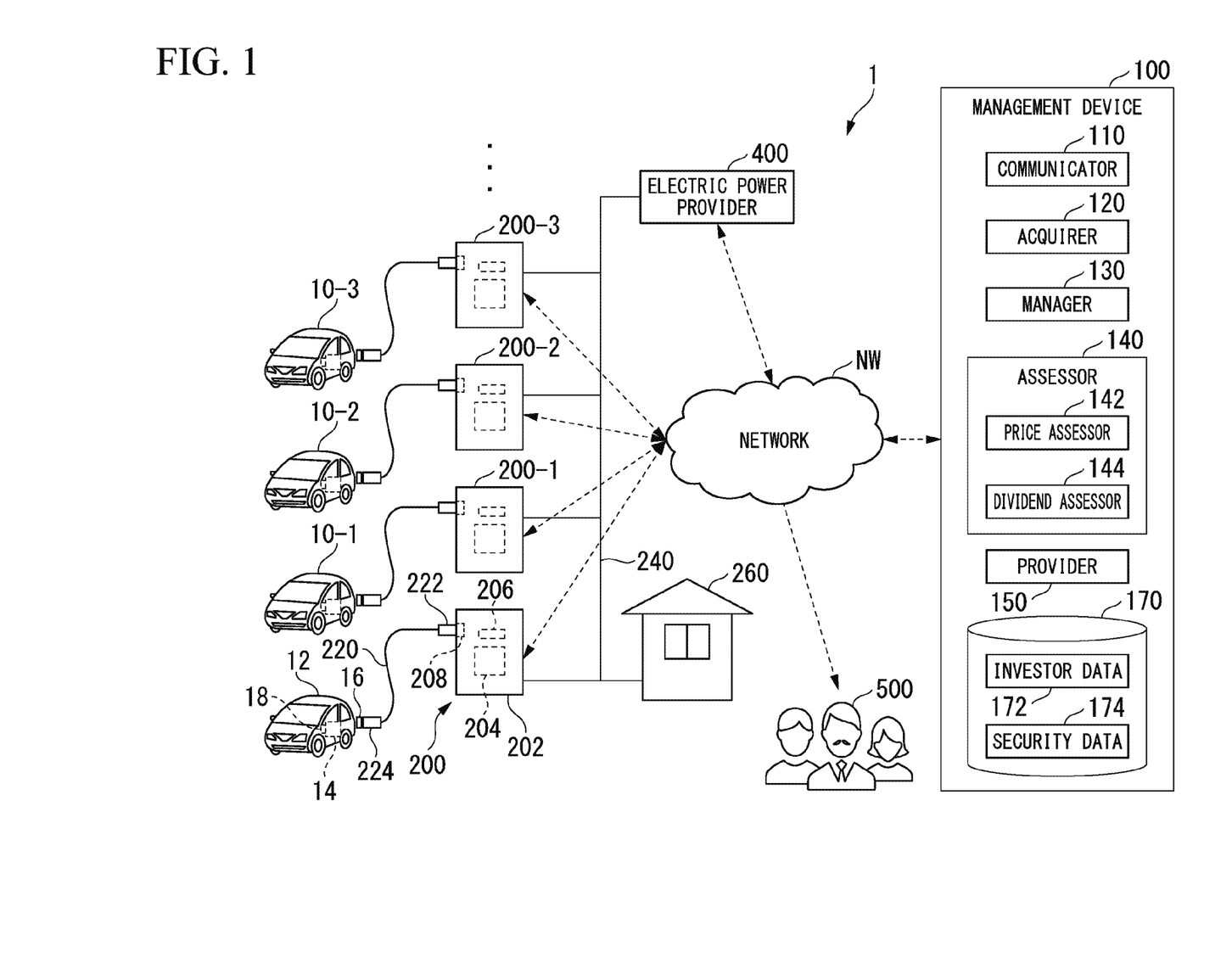
FIG. 1 is a diagram showing an example of a configuration and a use environment of a management device according to an embodiment.

FIG. 1 is a diagram showing an example of a configuration and a use environment of a management device 100 according to the embodiment. The management device 100 is a device that manages information related to securities (hereinafter, referred to as "security information") which is obtained by securitizing a part of a monetary value of an in-vehicle battery 14 mounted in a vehicle (in the following description, a "battery" is synonymous with a "secondary battery") and information related to an investor who purchases the securities (hereinafter, referred to as "investor information") and provides the security information to an investor 500 and the like. The security information includes information such as a price of the securities and resources included in the in-vehicle battery 14, a part of a monetary value of which has been securitized. The management device 100 is used by an organizer. The organizer conducts electric vehicle lease, sales, and management of information regarding electric power, securities, investors, and the like using the management device 100.

As shown in FIG. 1, the management device 100 communicates with a plurality of chargers 200 (although the chargers are shown as 200, 200-1, 200-2, 200-3, . . . in FIG. 1, the chargers are described simply as chargers 200 when the individual chargers 200 are not distinguished), a financial company 300, an electric power provider 400 included in the electric power network, and the investor 500 via a network NW. The network NW includes, for example, the Internet, a wide area network (WAN), a local area network (LAN), a provider device, a wireless base station, and the like.

A plurality of vehicles 10 (although the vehicles are shown as 10, 10-1, 10-2, 10-3, . . . in FIG. 1, the vehicles are described simply as vehicles 10 when the individual vehicles 10 are not distinguished) are provided by the organizer to users through leasing or selling, for example. In a case in which the vehicles 10 are sold, for example, loans are used. However, the vehicles 10 may be sold without the use of loans. The plurality of vehicles 10 are connected to the plurality of chargers 200 via charging cables 220, respectively. The charging cables 220 include signal cables provided along with electric power cables. The signal cables mediate communication between the vehicles 10 and the chargers 200. The chargers 200 may be able to be connected to the network NW.

The management device 100 manages electric power on the basis of information transmitted from the plurality of chargers 200, the financial company 300, and the electric power provider 400. A plurality of financial companies 300 and a plurality of electric companies 400 may be involved. The management device 100 executes an electric power exchanging business on the basis of the information transmitted from the plurality of chargers 200, the financial company 300, and the electric power provider 400. The electric power exchanging business is a business using a vehicle-to-grid (V2G) or vehicle-to-home (V2H) technology, for example. V2G means that the in-vehicle batteries 14 in the vehicle 10 are caused to work in collaboration with the electric power network to share electric power between the vehicles 10 and the electric power system. V2H means that electric power from the in-vehicle batteries 14 mounted in the vehicles 10 is used at home, such as users' homes.

The organizer issues securities obtained by securitizing a part of a monetary value of the in-vehicle battery 14 and seeks an investor 500 who purchases the securities when the organizer leases a vehicle to a user or the user purchases the vehicle. In a case in which there is an investor 500 who purchases the securities, the operator sells the securities to the investor 500 and applies the price by which the securities are purchased to a part of a lease price or a purchase price for the vehicle. In the embodiment, a part of the price of resources included in the in-vehicle battery 14 in the vehicle 10 is applied to a part of the lease price or the purchase price. The management device 100 manages information related to the in-vehicle battery 14, a part of a monetary value of which is securitized, and information related to the investor 500 who has purchased the securities as well. In the following description, each vehicle 10, each charger 200, the financial company 300, the electric power provider 400, and the investor 500 will be described, and the management device 100 will then be described.

[Vehicle 10]

The vehicle 10 includes a vehicle body 12, an in-vehicle battery 14, a charging port 16, and a battery control device 18. The vehicle body 12 is made of metal, for example, and the in-vehicle battery 14 and the battery control device 18 are provided therein. The in-vehicle battery 14 is a secondary battery such as a lithium ion battery, for example. The in-vehicle battery 14 can accumulate and discharge electric power. The electric power discharged from the in-vehicle battery 14 is used as electric power with which a traveling motor provided in the vehicle 10, which is not shown, is driven and the vehicle 10 travels, for example. The electric power discharged from the in-vehicle battery 14 is used for traveling and is also used for the electric power exchanging business conducted by the management device 100, for example.

The charging port 16 is provided such that the charging port 16 is directed outward to an exterior of the vehicle body 12. The charging port 16 is connected to the charger 200 via the charging cable 220. The charging cable 220 includes a first plug 222 and a second plug 224. The first plug 222 is connected to the charger 200 while the second plug 224 is connected to the charging port 16 of the vehicle body 12.

The battery control device 18 calculates a state-of-charge (SOC; charging rate) and a state-of-health (SOH; degradation state) of the in-vehicle battery 14 on the basis of a current value, a voltage value, a temperature, and the like of the in-vehicle battery 14. The battery control device 18 transmits battery information including calculated SOC and SOH to the charger 200 through the charging cable 220.

[Charger 200]

The charger 200 includes a case body 202, a stationary battery 204, a control device 206, and a cable connection port 208. An electric power transmission line 240 is connected to the charger 200. The case body 202 houses the stationary battery 204 and the control device 206. The charger 200 is placed, for example, near a garage of a home 260 of a user who owns the vehicle 10. Since it is possible to save electric power and use the electric power at night due to the charger 200 being placed, the user can charge the vehicle 10 with inexpensive electric power.

The stationary battery 204 is a secondary battery such as a lithium ion battery, for example. The electric power discharged from the stationary battery 204 is used to charge the vehicle 10 that the user owns and is applied to domestic use at the home 260 of the user, for example. The electric power discharged from the stationary battery 204 is used to charge the vehicle 10 and the like and is also provided to the electric power provider 400.

The control device 206 can communicate with the vehicle 10, the management device 100, and the electric power provider 400. The control device 206 controls discharge and charge of the stationary battery 204 on the basis of information input from an input device provided outside the case body 202, which is not shown, and information and the like provided by the vehicle 10, the management device 100, and the electric power provider 400.

The control device 206 acquires SOC and SOH of the in-vehicle battery 14 on the basis of battery information transmitted from the battery control device 18 provided in the vehicle 10. SOH is represented by, for example, Lv1 to Lv5, and a larger Lv represents more severe degradation. For example, the in-vehicle battery 14 with an SOH of Lv2 is more degraded than the in-vehicle battery 14 with an SOH of Lv1. The in-vehicle battery 14 with an SOH of Lv5 is a battery that has most severely degraded. The charging capacity of the in-vehicle battery 14 is substantially proportional to SOH, and the charging capacity decreases as Lv (degree of degradation) represented by SOH increases.

The control device 206 performs charging control for discharging and charging between the in-vehicle battery 14 and the stationary battery 204 on the basis of acquired SOC and the like. In a case in which SOC of the in-vehicle battery 14 is low and is an SOC requiring charging, for example, the control device 206 performs control to cause the stationary battery 204 to discharge electric power to the in-vehicle battery 14, thereby charging the in-vehicle battery 14. In a case in which SOC of the in-vehicle battery 14 is high and is an excessively charged SOC, for example, the control device 206 performs control to cause the in-vehicle battery 14 to discharge electric power to the stationary battery 204, thereby charging the stationary battery 204.

The control device 206 adds a battery ID to the battery information transmitted from the battery control device 18 and transmits the battery information with the battery ID to the management device 100. The control device 206 causes the stationary battery 204 to discharge electric power and supplies the electric power to the electric power provider 400 in response to a request that the electric power provider 400 desires to receive supply of electric power.

The cable connection port 208 is formed to be open in an outer surface of the case body 202. The first plug 222 of the charging cable 220 can be connected to the cable connection port 208. The electric power discharged from the in-vehicle battery 14 is supplied to the cable connection port 208 via the charging cable 220, and the stationary battery 204 of the charger 200 is charged with the electric power. The electric power with which the stationary battery 204 is charged is used for the electric power exchanging business, for example. The electric power discharged from the stationary battery 204 of the charger 200 is supplied to the charging port 16 via the charging cable 220, and the in-vehicle battery 14 is charged with the electric power.

The charger 200 is connected to the user's home 260 and the electric power provider 400 via the power transmission line 240. The electric power discharged from the stationary battery 204 is supplied to the user's home 260 via the power transmission line 240. At the user's home 260, the provided electric power is used as electric power for domestic use. The electric power discharged from the stationary battery 204 is supplied to the electric power provider 400 via the power transmission line 240. The stationary battery 204 is charged with electric power provided by the electric power provider 400. The electric power with which the stationary battery 204 is charged is also used for charging the in-vehicle battery 14, for example.

[Financial Company 300]

The financial company 300 stores information related to resources used in the secondary battery (hereinafter, referred to as "resource information"). The resources used in the secondary battery are, for example, recyclable resources and are, specifically, rare metals such as cobalt, neodymium, and dysprosium. The resource information is, for example, a price (a unit price per unit weight) of each rare metal.

The prices of resources such as rare metal increases and decreases due to influences of social conditions and the like. The financial company 300 stores the prices of these resources. The financial company 300 updates the stored resource information and transmits the updated resource information to the management device 100 when the prices of the resources vary. The financial company 300 may transmit the resource information to the management device 100 at another timing. For example, the financial company 300 may transmit the resource information to the management device 100 in response to a request from the management device 100.

[Electric Power Provider 400]

The electric power provider 400 provides a service of supplying electric power to customers. The electric power provider 400 supplies electric power to the chargers 200 or receives supply of electric power from the chargers 200 via the power transmission line 240, for example. In a case in which the electric power provider 400 desires to receive supply of electric power, the electric power provider 400 transmits electric power request information to the management device 100. In a case in which the electric power provider 400 receives supply availability information transmitted by the management device 100 that has received the electric power request information, the electric power provider 400 receives supply of electric power from the plurality of chargers 200. In a case in which the electric power provider 400 receives the supply of a requested amount of electric power from the charger 200, the electric power provider 400 transmits electric power reception completion information to the management device 100.

[Investor 500]

The investor 500 is a person who purchases securities obtained by securitizing a part of a monetary value of the in-vehicle battery 14. The investor 500 may include the person who has purchased the securities and also a person who desires to purchase the securities or considers the purchase of the securities or the like. The investor 500 owns an information terminal, for example, and transmits and receives information to and from the management device 100 using the information terminal that the investor 500 owns. In a case in which the investor 500 desires to purchase the securities, for example, the investor 500 transmits purchase desire information from the information terminal to the management device 100. The purchase desire information includes information such as an investor ID for identifying the investor and a type and a price of securities that the investor 500 desires to purchase. In a case in which the investor 500 desires to know the security information, for example, the investor 500 transmits security information request information from the information terminal to the management device 100.

The information terminal that the investor 500 owns includes, for example, a display device that displays information and a speaker that outputs sound. In a case in which the security information is transmitted from the management device 100, the information terminal, which the investor 500 owns, performs display on the display device or outputs sound from the speaker such that information included in the security information is provided to the investor 500.

[Management Device 100]

The management device 100 includes a communicator 110, an acquirer 120, a manager 130, an assessor 140, a provider 150, and a storage 170. The acquirer 120, the manager 130, the assessor 140, and the provider 150 are realized by a hardware processor such as a central processing unit (CPU) executing a program (software). A part or all of these components may be realized by hardware (circuit unit: including a circuitry) such as a large scale integration (LSI), an application specific integrated circuit (ASIC), a field-programmable gate array (FPGA), or a graphics processing unit (GPU) or may be realized by cooperation of software and hardware. The program may be stored in advance in a storage device (non-transitory storage medium) such as a hard disk drive (HDD) or a flash memory or may be stored in a detachable storage medium (non-transitory storage medium) such as a DVD or a CD-ROM and may be installed by attaching the storage medium to a drive device. The storage 170 is realized by the aforementioned storage device.

The communicator 110 includes a communication interface such as NIC. The communicator 110 transmits and receives information to and from the plurality of chargers 200, the financial company 300, and the electric power provider 400 via the network NW. The communicator 110 receives battery information transmitted from each of the plurality of chargers 200, for example. The communicator 110 receives resource information transmitted from the financial company 300, for example. The communicator 110 receives electric power request information and electric power reception completion information transmitted from the electric power provider 400, for example. The communicator 110 receives security information request information transmitted from the information terminal that the investor 500 owns, for example. The communicator 110 outputs the various kinds of received information to the acquirer 120.

The acquirer 120 acquires various kinds of information output by the communicator 110. The acquirer 120 outputs the battery information, the electric power request information, the electric power reception completion information, the resource information, and the purchase desire information among the acquired various kinds of information to the manager 130. The acquirer 120 outputs the security information request information to the provider 150.

The manager 130 manages electric power discharged from the in-vehicle battery 14 to the stationary battery 204 and the electric power accumulated in the stationary battery 204. The manager 130 conducts the electric power exchanging business using the electric power discharged from the in-vehicle battery 14 to the stationary battery 204 and the electric power accumulated in the stationary battery 204.

In a case in which the electric power request information is output by the acquirer 120, for example, the manager 130 transmits the electric power supply information for providing the electric power accumulated in the in-vehicle batteries 14 mounted in a plurality of vehicles 10 to the electric power provider 400. The electric power provider 400 receives the electric power supply information and then supplies supply of the electric power from the in-vehicle batteries 14 mounted in the plurality of vehicles 10.

The electric power provider 400, which has received the supply of the electric power and has completed the reception of the electric power, transmits the electric power reception completion information to the management device 100. The electric power reception completion information transmitted to the management device 100 is output to the manager 130 via the communicator 110 and the acquirer 120. In a case in which the electric power reception completion information is output by the acquirer 120, the manager 130 generates information regarding a value corresponding to the supplied electric power. Thus, the management device 100 obtains revenue (hereinafter, referred to as "business revenue") of the electric power exchanging business from the electric power provider 400.

The manager 130 calculates the business revenue at a dividend timing. The business revenue is a price obtained by subtracting a cost for purchasing electric power and other various costs from the earnings obtained by selling electric power, for example. The dividend timing is a timing of once or twice a year which is set annually or biannually, for example.

Figure 2:
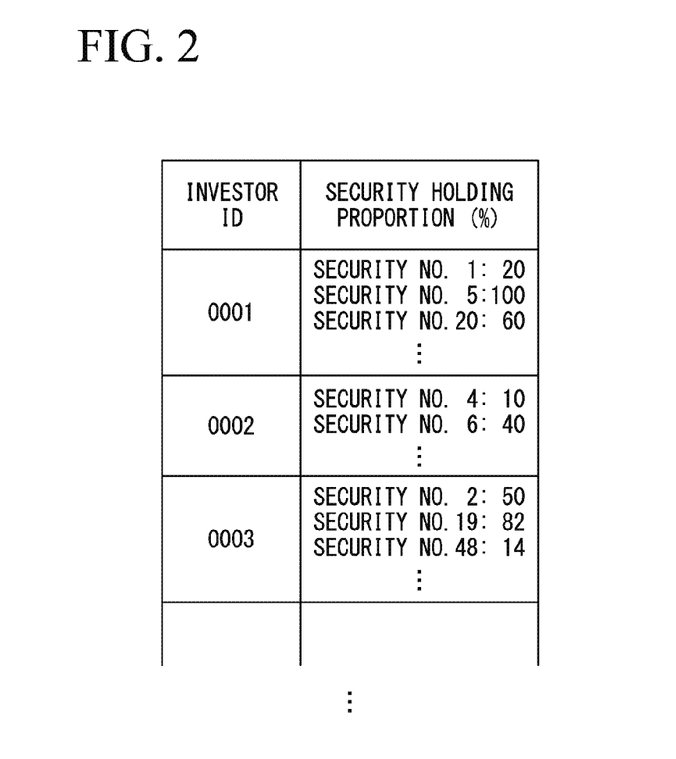
FIG. 2 is a diagram showing an example of investor data.

The manager 130 generates or updates the investor data 172 and stores the generated or updated investor data 172 in the storage 170, thereby managing the investor information. FIG. 2 is a diagram showing an example of the investor data 172. As shown in FIG. 2, the investor data 172 includes the respective items of investor IDs and securities holding proportions.

In a case in which the purchase desire information is output by the acquirer 120, and it is confirmed that the investor 500 has paid the price corresponding to the monetary value of the securities to the organizer, for example, the manager 130 updates the investor data 172. The manager 130 checks the investor IDs included in the purchase desire information to update the investor data 172.

The manager 130 updates each securities holding proportion of the investor ID included in the purchase desire information in the investor data 172 in accordance with the purchase desire information. In a case in which the investor ID included in the purchase desire information is not present in the investor data base 172, the manager 130 newly adds the investor ID to the investor data 172.

Figure 3:
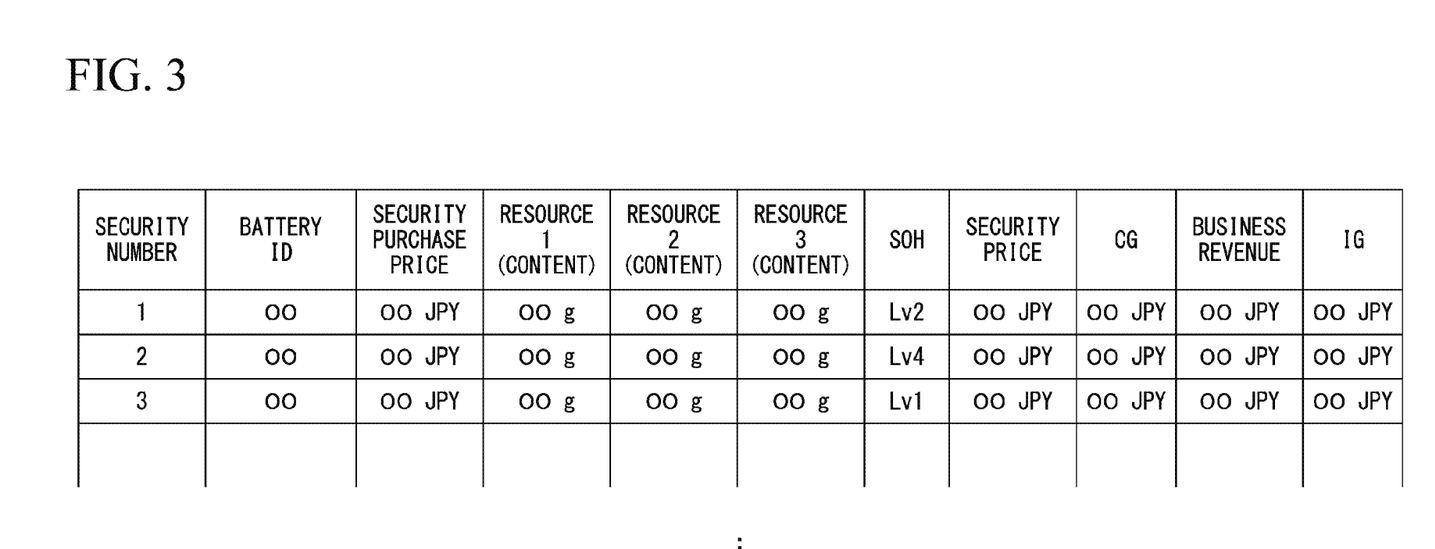
FIG. 3 is a diagram showing an example of security data.

The manager 130 generates or updates the security data 174 and stores the generated or updated security data 174 in the storage 170, thereby managing the security information. FIG. 3 is a diagram showing an example of the security data 174. As shown in FIG. 3, the security data 174 includes the respective items of security numbers, battery IDs, security purchase prices, a resource 1, a resource 2, a resource 3, SOH, the security prices, capital gains (CG), business revenues, and income gains (IG).

The security number is a number applied to identify each security. The battery ID is an ID for identifying the in-vehicle battery 14, a part of a monetary value of which is securitized, and is an ID applied to each of the in-vehicle batteries 14 mounted in the vehicles 10, 10-1, 10-2, 10-3, . . . shown in FIG. 1. The security purchase price is a price of securities when the sales are started. In the embodiment, the security purchase price is a price obtained by subtracting a recycling cost from the total price (total resource price) when the securities of the resources included in the in-vehicle battery 14 are purchased.

The resources 1 to 3 are items indicating weights of the resources included in each in-vehicle battery 14. The types and the weights of the resources included in the in-vehicle battery 14 differ depending on the type of the in-vehicle battery 14. Therefore, the security data 174 includes items of weights of the resources 1 to 3. Although the number of the types of the resources is three in the embodiment, more types of resources may be included.

The security price is a price of securities at a timing at which the financial company 300 transmits the resource information. In the embodiment, the security price is a price obtained by subtracting a recycle cost from a total resource cost at the timing at which the financial company 300 of the resources included in the battery transmits the resource information. The capital gain is assessed on the basis of the security purchase price and the security price. The business revenue is revenue calculated by the manager 130. The income gain is calculated on the basis of the business revenue.

In a case in which the battery information is output by the acquirer 120, for example, the manager 130 updates SOH included in the security data 174 to SOH included in the battery information and stores the updated SOH in the storage 170. In a case in which the resource information is output by the acquirer 120, for example, the manager 130 updates a numerical value of the resource information included in the security data 174 to a numerical value of the resource information output by the acquirer 120.

The manager 130 outputs the resource information output by the acquirer 120 and the information of the calculated business revenue to the assessor 140. The assessor 140 includes a price assessor 142 and a dividend assessor 144. The price assessor 142 assesses the total resource price of the securities on the basis of the resources 1 to 3 included in the resource information and the security data 174 output by the acquirer 120. The price assessor 142 assesses the total resource price using Equation (1) below, for example.

$$\text{Total resource price} = \Sigma(\text{price of resource } n) \times (\text{weight of resource } n) \qquad (1)$$

In Equation (1) described above, n is a natural number. The price of the resource n is determined on the basis of the resource information transmitted from the financial company 300. The weight of the resource n is a weight stored for the respective items of the resources 1 to 3.

The price assessor 142 assesses the security price by subtracting the recycle cost from the assessed total resource price. The price assessor 142 calculates the capital gain of the securities on the basis of the security purchase price included in the security data 174 and the assessed security price. The price assessor 142 assesses the capital gain using Equation (2) below, for example.

$$\text{Capital gain} = \text{security price} - \text{security purchase price} \qquad (2)$$

The manager 130 updates the items of the security price and the capital gain of each security in the security data 174 in accordance with the security price and the capital gain of each security assessed by the price assessor 142. Since the resource information changes moment by moment, the manager 130 updates the items of the security price and the capital gain of each security in the security data 174 moment by moment.

The dividend assessor 144 acquires a dividend resource on the basis of the business revenue calculated by the manager 130 and calculates the income gain corresponding to the dividend of the securities using Equation (3) below, for example. The dividend resource is, for example, several % of the business revenue.

$$\text{Income gain} = (\text{dividend resource/number of securities}) \times \text{contribution rate} \qquad (3)$$

Here, the number of securities is a number of securities to which security numbers are applied. The contribution rate is a proportion at which each in-vehicle battery 14, a part of a monetary value of which is securitized, contributes to the electric power exchanging business and is a value set such that a value obtained by adding contribution rates of all the securities is one. The contribution rate is determined on the basis of SOH and SOC of the in-vehicle battery 14, a part of a monetary value of which is securitized, and the amount of electric power supplied by the in-vehicle battery 14.

The manager 130 updates the item of the business revenue of each security in the security data 174 in accordance with the calculated business revenue. The manager 130 updates the items of the business revenue and the income gain of each security in the security data 174 in accordance with the income gain assessed on the basis of the business revenue. Since the business revenue is calculated once or twice a year, for example, the manager 130 updates the items of the business revenue and the income gain of each security in the security data 174 once or twice a year.

Figure 4:
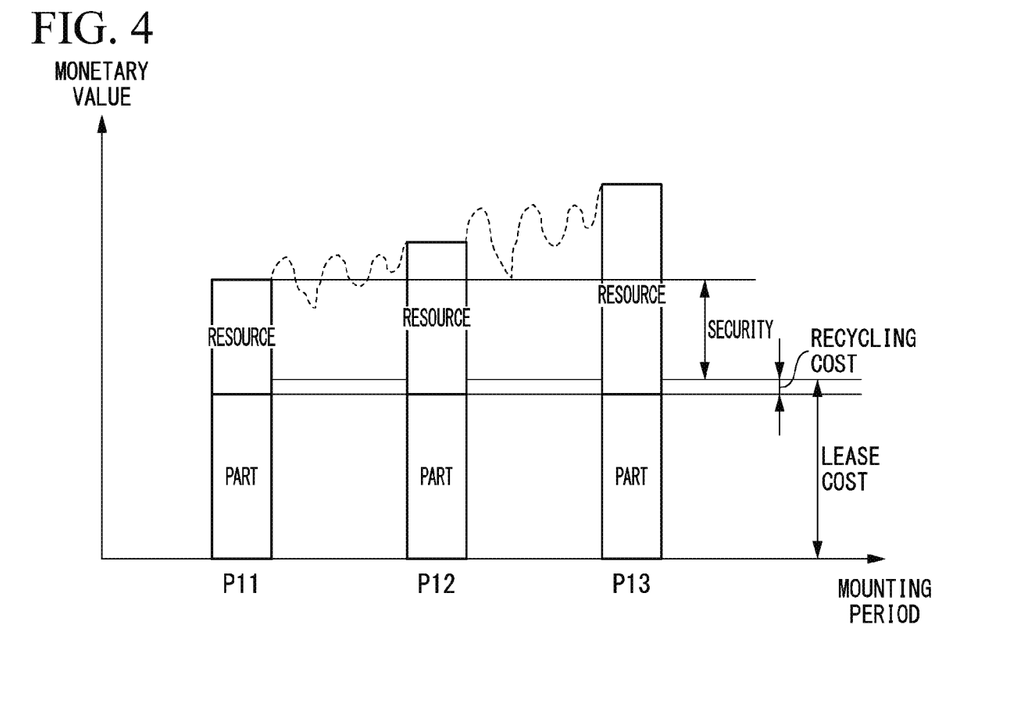
FIG. 4 is a graph showing an example of a variation in monetary value of an in-vehicle battery.

FIG. 4 is a graph showing an example of a variation in monetary value of the in-vehicle battery 14. The monetary value of the in-vehicle battery includes a part cost and resources, for example. Among these, the monetary value of parts is constant while monetary value of the resources varies. Therefore, the monetary value of the in-vehicle battery 14 increases or decreases with elapse of a time during which the in-vehicle battery 14 is mounted in the vehicle 10.

In the example shown in FIG. 4, the monetary value of the in-vehicle battery 14 gradually increases while repeating an increase and a decrease with an increase and decrease in economic value of the resources from a first timing P11 to a second timing P12. Further, the monetary value of the in-vehicle battery 14 gradually increases while repeating an increase and a decrease with an increase and a decrease in economic value of the resources from the second timing P12 to a third timing P13 as well. In the embodiment, a part of the monetary value of the resources included in the in-vehicle battery 14 is securitized. Therefore, an increase due to the rise of the economic value of the resources becomes a capital gain of the securities. Although the economic value of the resources increases over a long period of time in the example shown in FIG. 4, the monetary value of the resources may decrease.

In the embodiment, the monetary value of the in-vehicle battery 14 is covered by the purchase cost of the securities, a recycling cost, and a lease cost (or a purchase cost of the vehicle). Specifically, a part of the monetary value of the resources included in the in-vehicle battery 14 is securitized, and the remaining part of the resources is covered by the recycle cost. The monetary value of the parts in the in-vehicle battery 14 is covered by the lease cost or the purchase cost of the vehicle 10.

Figure 5:
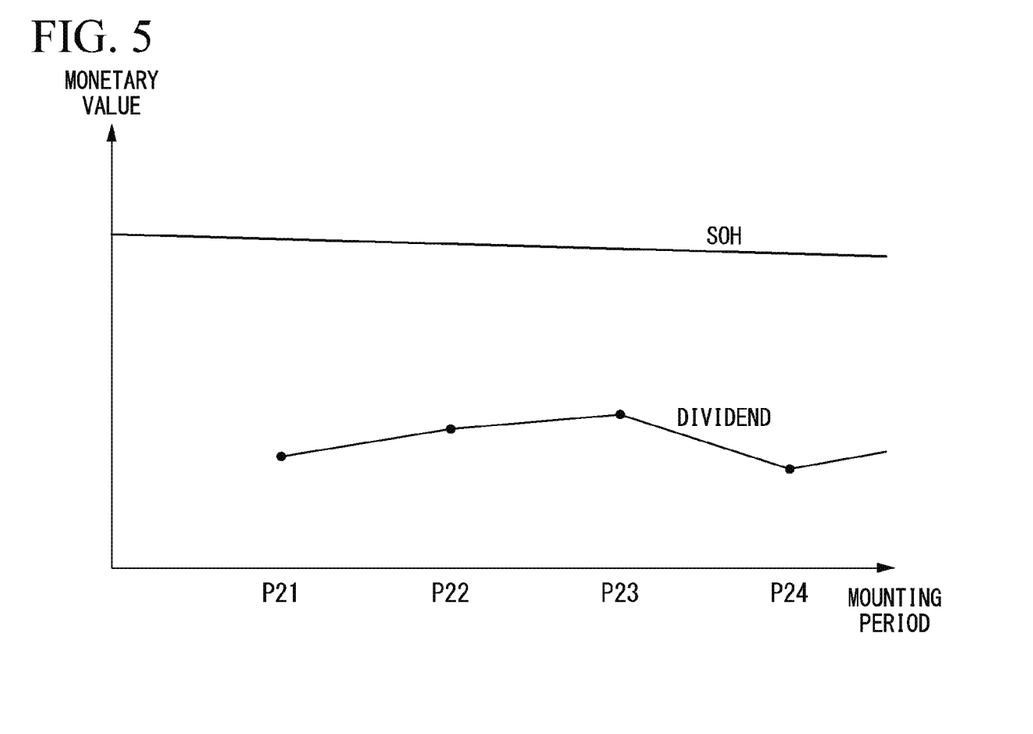
FIG. 5 is a graph showing an example of a variation in a dividend due to an SOH and business revenue of the in-vehicle battery.

FIG. 5 is a graph showing an example of a variation in a dividend due to SOH and business revenue of the in-vehicle battery 14. Although there is no direct variation in monetary value due to the SOH of the in-vehicle battery 14, the rate of contribution to the dividend decreases with a decrease in SOH. Therefore, the monetary value of the in-vehicle battery 14 decreases indirectly with the decrease in SOH. Since SOH of the in-vehicle battery 14 gradually decreases over time, the monetary value of SOH also gradually decreases over time.

When the dividend timing of the securities is reached, the dividend is given back to the investor 500. The dividend given back to the investor 500 is directly a monetary value. If the first dividend is given back at a first dividend timing P21, the second dividend is given back at a second divided timing P22 that is the next dividend timing. In the example shown in FIG. 5, the dividend given back at the second dividend timing P22 is greater than the dividend given back at the first dividend timing P21. This is attributable to the fact that the business revenue between the first dividend timing P21 and the second dividend timing P22 is greater than the business revenue from the timing at which the electric power exchanging business is started to the first dividend timing.

Similarly, the dividend given back at a third dividend timing P23 is larger than the dividend given back at the second dividend timing P22. This is attributable to the fact that the business revenue between the second dividend timing P22 and the third dividend timing P23 is greater than the business revenue between the first dividend timing P21 and the second dividend timing P22. The dividend given back at a fourth dividend timing P24 is less than the dividend given back at the third dividend timing P23. This is attributable to the fact that the business revenue between the third dividend timing P23 to the fourth dividend timing P24 is less than the business revenue between the second dividend timing P22 and the third dividend timing P23 and the rate of contribution decreases with a decrease in SOC. In this manner, the dividend given back to the investor 500 increases and decreases depending on the dividend timing. The dividend given back to the investor 500 is an income gain of the securities.

In a case in which the acquirer 120 outputs security information request information, the provider 150 reads the investor data 172 and the security data 174 from the storage 170. The provider 150 generates security information on the basis of the security data 174 read from the storage 170 and outputs the generated security information to the communicator 110. The provider 150 generates information including SOH of the in-vehicle battery 14, the security price, the capital gain, the business revenue, the income gain, and the like as security information for each in-vehicle battery 14, for example.

The communicator 110 transmits the security information output by the provider 150 to the investor 500 that has transmitted the security information request information. Thus, the provider 150 provides the security information based on the security data 174 read from the storage 170 to the investor 500 that has transmitted the security information request information via the communicator 110.

Figure 6:
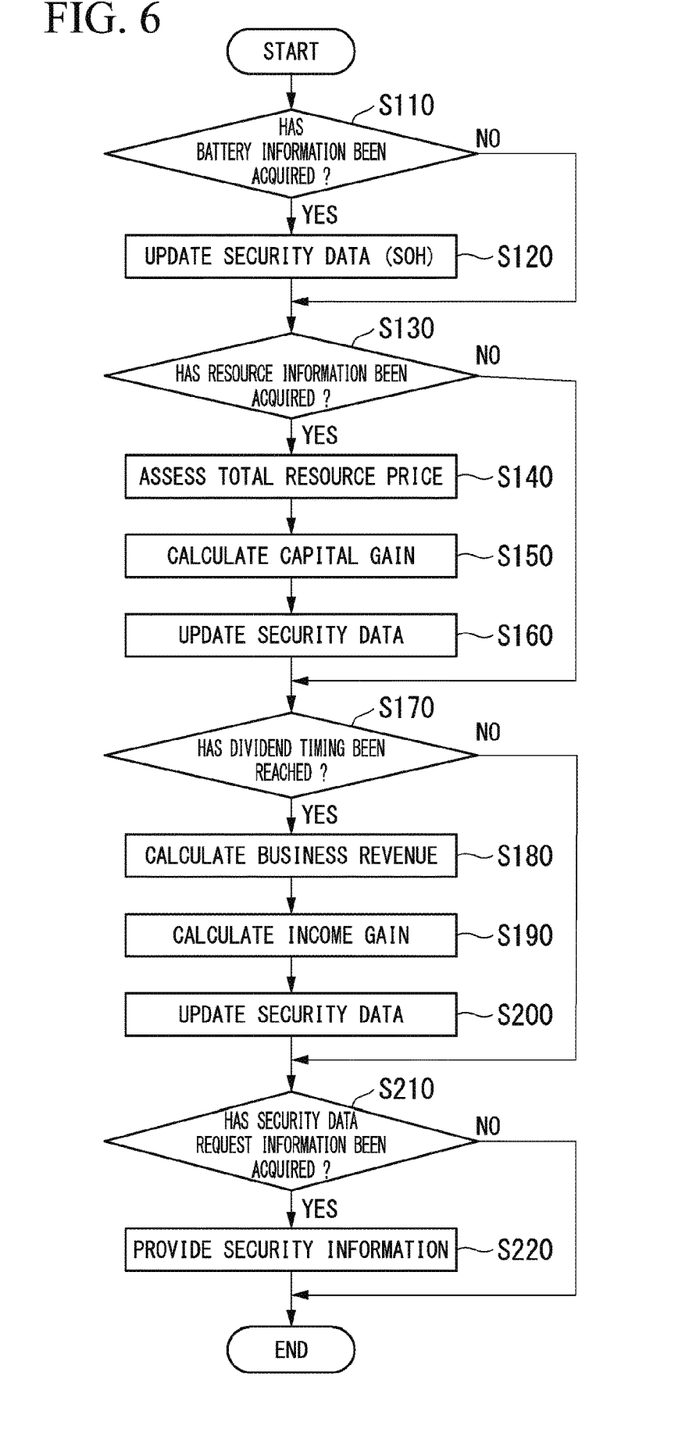
FIG. 6 is a flowchart showing an example of a flow of processing executed by the management device.

Next, processing performed by the management device 100 will be described. FIG. 6 is a flowchart showing an example of a flow of processing executed by the management device 100. The manager 130 determines whether or not the acquirer 120 has acquired battery information transmitted by the charger 200 and output via the communicator 110 (Step S110).

In a case in which it is determined that the acquirer 120 has not acquired the battery information, the manager 130 moves on to processing in Step S130. In a case in which it is determined that the acquirer 120 has acquired the battery information, the manager 130 updates the value of SOH in the security data 174 to the value of SOH included in the battery information and stores the updated security data 174 in the storage 170 (Step S120).

Next, the manager 130 determines whether or not the acquirer 120 has acquired resource information transmitted by the financial company 300 and output via the communicator 110 (Step S130). In a case in which the acquirer 120 has not acquired the resource information, the manager 130 moves on to processing in Step S170. In a case in which the acquirer 120 has acquired the resource information, the manager 130 causes the price assessor 142 to assess the total resource price on the basis of the resource information and the security information (Step S140).

Next, the manager 130 causes the price assessor 142 to calculate the security price on the basis of the calculated total resource price and causes the price assessor 142 to assess the capital gain on the basis of the security price and the security purchase price (Step S150). Next, the manager 130 updates the total resource price, the security price, and the capital gain in the security data 174 to numerical values assessed by the price assessor 142 and stores the updated security data 174 in the storage 170 (Step S160).

Next, the manager 130 determines whether or not a dividend timing has been reached (Step S170). In a case in which it is determined that the dividend timing has not been reached, the manager 130 moves on to processing in Step S210. In a case in which it is determined that the dividend timing has been reached, the manager 130 calculates the business revenue (Step S180).

Next, the manager 130 outputs information regarding the business revenue to the dividend assessor 144 and causes the dividend assessor 144 to assess the income gain (Step S190). Next, the manager 130 updates the business revenue and the income gain in the security data 174 to the calculated numerical value and the numerical value assessed by the dividend assessor 144 and stores the updated security data 174 in the storage 170 (Step S200).

Next, the provider 150 determines whether or not the acquirer 120 has acquired security information request information transmitted by the information terminal owned by the investor 500 and output via the communicator 110 (Step S210). In a case in which the acquirer 120 has not acquired the security information request information, the management device 100 ends the processing shown in FIG. 6. In a case in which the acquirer 120 has acquired the security information request information, the provider 150 reads the security data 174 stored in the storage 170, generates security information, and transmits the security information to the information terminal that the investor 500 owns. Thus, the provider 150 provides the security information to the investor 500 (Step S220). Thereafter, the management device 100 ends the processing shown in FIG. 6.

According to the embodiment described above, the management device 100 sells the securities obtained by securitizing a part of the in-vehicle battery 14 to the investor 500 and applies the price to a part of the price when the vehicle 10 is leased or sold. Therefore, the user who receives the lease of the vehicle 10 or purchases the vehicle 10 does not pay all the costs for the entire vehicle 10, and a part of the cost is covered by the cost of the securities purchased by the investor 500. Therefore, it is possible to reduce the price of the in-vehicle battery 14 and thus the price of the vehicle 10 to low prices.

The securities that the investor 500 purchases are a part of the monetary value of the in-vehicle battery 14. The in-vehicle battery 14 includes resources such as rare metal, and the prices of these resources increase or decrease depending on social conditions and the like. Therefore, the price of the securities that the investor 500 has purchased also increases or decreases. Further, the dividend for the securities in accordance with the business revenue is given back to the investor 500. Therefore, since the investor 500 can obtain the capital gain with an increase in the price of securities and the income gain of the dividend, the management device 100 can provide a motivation to purchase the securities to the investor 500.

The management device 100 provides security information related to the securities, for example, information such as SOH of the in-vehicle battery 14, a part of which is securitized, the security price, the capital gain, the business revenue, the income gain, and the like. Therefore, since it is possible to provide information, which is required to choose securities to be purchased, to the investor 500, the investor 500 can obtain information for purchasing securities with a high probability that the investor 500 can obtain a large profit.

The organizer can obtain revenue from the electric power exchanging business using the in-vehicle batteries 14. Further, since the organizer can lease or sell the vehicles 10 at a low price, the organizer is likely to increase the number of leased or purchased vehicles 10 and is likely to obtain the corresponding revenue. Even in a case in which there is no investor 500 who purchases the securities, for example, the organizer himself/herself serves as the investor 500. Therefore, it is possible to prevent the organizer from suffering a large loss even in the case in which there is no investor 500 who purchases the securities.

Although the organizer leases and sells the electric vehicles, for example, and manages information regarding electric power, securities, investors, and the like using the management device 100 in the aforementioned embodiment, these may be performed by different persons. Although the battery information of the in-vehicle batteries 14 are transmitted from the chargers 200 to the management device 100 in the aforementioned embodiment, the battery information of the in-vehicle batteries 14 may be transmitted with battery IDs from the vehicles 10 to the management device 100. Although a part of the monetary value of the resources included in the in-vehicle batteries 14 is securitized in the aforementioned embodiment, a part of a monetary value including parts other than the resources included in the in-vehicle batteries 14 may be securitized.

Although the provider 150 provides the security information to the investor 500 that has transmitted the security information request information in the aforementioned embodiment, the provider 150 may provide the security information to another person. For example, the provider 150 may regularly or irregularly provide the security information to the investor 500 who has purchased the securities regardless of whether or not the security information request information has been issued. The provider 150 may provide the security information to a third person or many unspecified persons. The organizer may own a part of the securities such that the organizer is in the position equivalent to that of the investor 500. In this case, the capital gain, the income gain, and the like are shared by the organizer and the investor 500. Also, although the securities are sold to the investor 500 by the organizer, the securities may be sold to the organized by the investor 500 or may be sold between investors 500. In a case in which the securities are sold and purchased between the investors 500, the organizer may mediate the sales.

Although the embodiment has been described above for the form in which the invention is carried out, the invention is not limited to such an embodiment, and various modifications and replacements can be added without departing from the gist of the invention.

What is claimed is:

1. A management device comprising:
   a hardware processor that executes executable components stored on a memory, the executable components comprising:
   a communicator configured to acquire, from a charger configured to charge an electric vehicle, battery information relating to a secondary battery installed in the electric vehicle;
   a manager configured to manage information related to a price of securities obtained by securitizing a part of a monetary value of the secondary battery based on the battery information;
   a price assessor configured to assess the price of the securities; and
   a provider configured to send, to an information terminal, price data indicating the price of the securities assessed by the price assessor,
   wherein the manager is further configured to send power supply availability information, determined based on the battery information, to an electric power provider, the power supply availability information controlling reception of electric power from the charger by the electric power provider.

2. The management device according to claim 1,
   wherein the manager is further configured to manage information related to an investor who has purchased the securities,
   the information terminal is owned by the investor, and
   the provider is configured to provide the price of the securities to the information terminal in response to receipt of a request for the price from the information terminal.

3. The management device according to claim 1,
   wherein the part of the monetary value of the secondary battery that is securitized includes a price of recyclable resources in the secondary battery, and
   the price assessor is configured to assess the price of the securities based on the price of the recyclable resources.

4. The management device according to claim 1, wherein the executable components further comprise:
   a dividend assessor configured to assess a dividend of the securities based on revenue of an electric power exchanging business performed through connection between the secondary battery and an electric power network.

5. The management device according to claim 1, wherein the secondary battery is mounted in a vehicle and is configured to supply electric power to cause the vehicle to travel.

6. A management method comprising, by a computer:
   receiving, by a system comprising a processor, battery information from a charger configured to charge an electric vehicle, the battery information relating to a secondary battery installed in the electric vehicle;
   managing, by the system, information related to a price of securities, wherein the information is obtained by securitizing a part of a monetary value of the secondary battery based on the battery information;
   assessing, by the system, the price of the securities;
   sending, by the system to an information terminal, price information indicating the price of the securities; and
   in response to receiving electric power request information from an electric power provider, sending, by the system, power supply availability information, determined based on the battery information, to the electric power provider, wherein the power supply availability information controls reception of electric power from the charger by the electric power provider.

7. A non-transitory computer-readable storage medium that stores a program that causes a computer to:

receive battery information from a charger configured to charge an electric vehicle, the battery information relating to a secondary battery installed in the electric vehicle manage information related to a price of securities, wherein the information is obtained by securitizing a part of a monetary value of the secondary battery based on the battery information;

assess the price of the securities;

transmit price information indicating the price of the securities to an information terminal; and in response to receipt of electric power request information from an electric power provider, send power supply availability information, determined based on the battery information, to the electric power provider, wherein the power supply availability information controls reception of electric power from the charger by the electric power provider.

* * * * *